Dec. 19, 1950  J. AUSCHER  2,534,847
DIRECTIONAL SOUND DETECTOR
Filed July 30, 1947  5 Sheets-Sheet 1
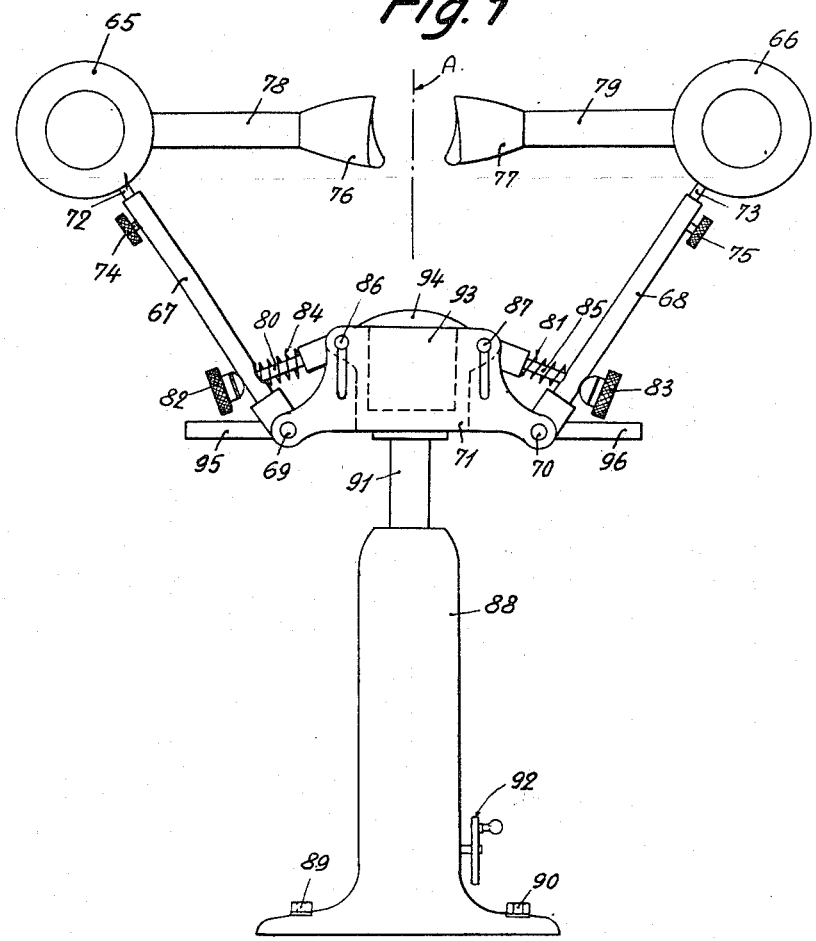
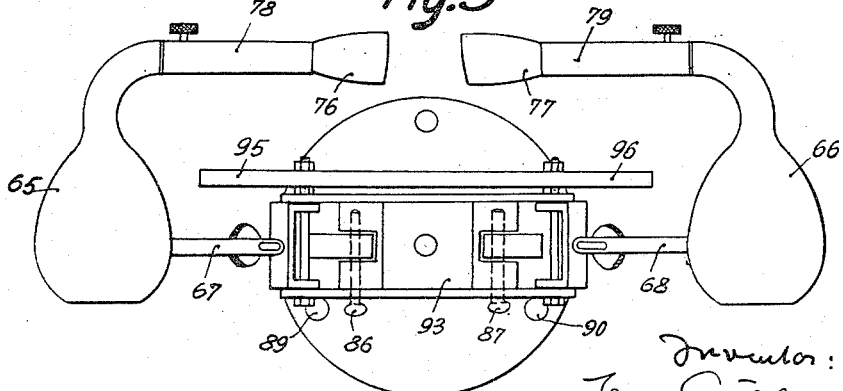

Dec. 19, 1950 J. AUSCHER 2,534,847
DIRECTIONAL SOUND DETECTOR
Filed July 30, 1947 5 Sheets-Sheet 2
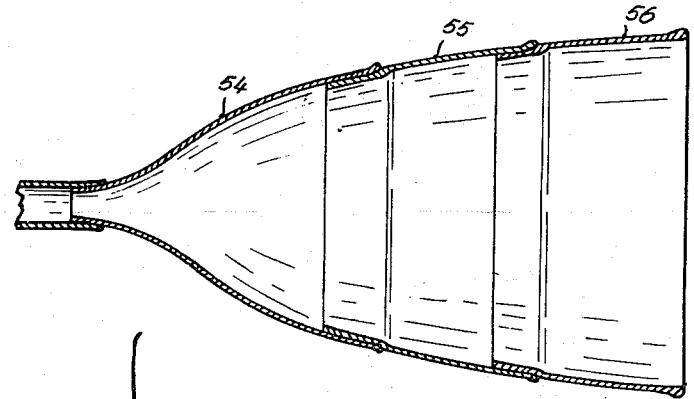
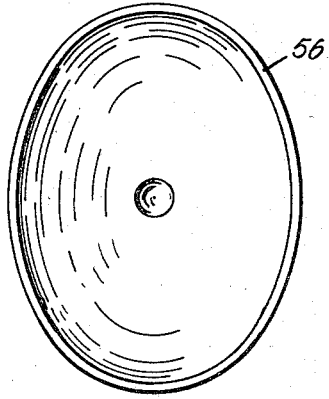
Fig. 4
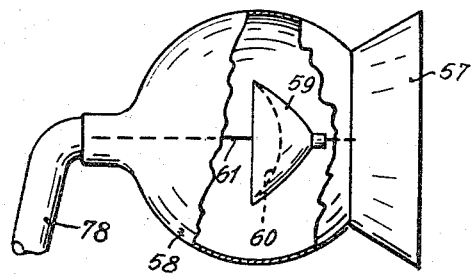
Fig. 5

Dec. 19, 1950   J. AUSCHER   2,534,847
DIRECTIONAL SOUND DETECTOR
Filed July 30, 1947   5 Sheets-Sheet 3
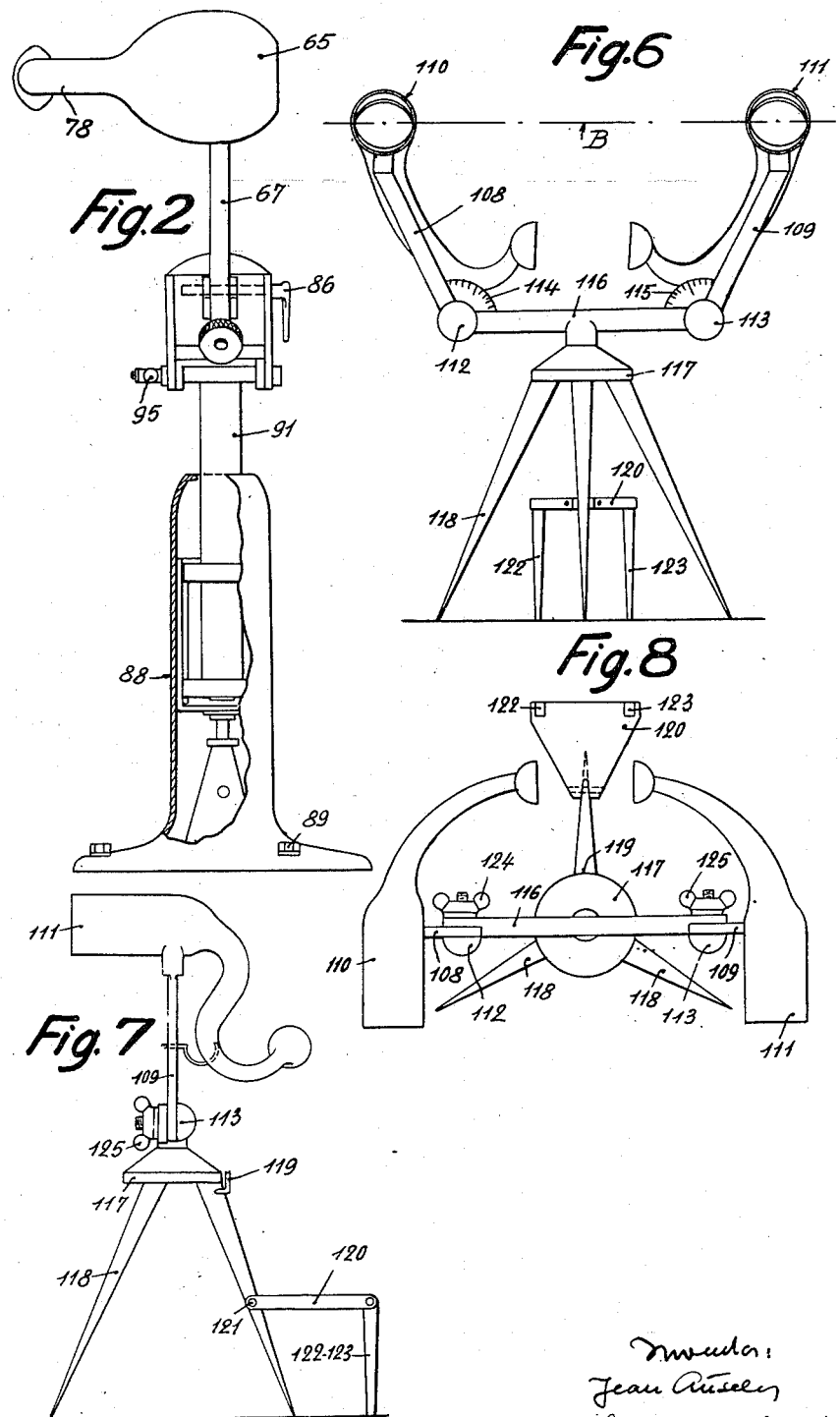

Dec. 19, 1950  J. AUSCHER  2,534,847
DIRECTIONAL SOUND DETECTOR
Filed July 30, 1947  5 Sheets-Sheet 4
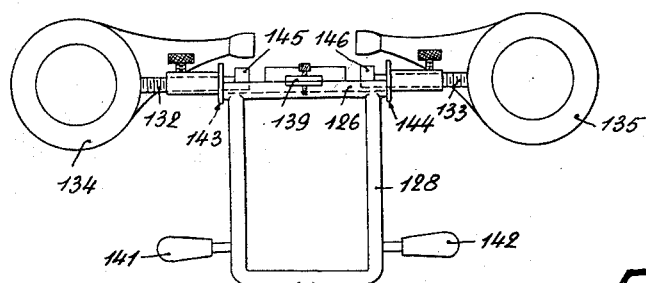
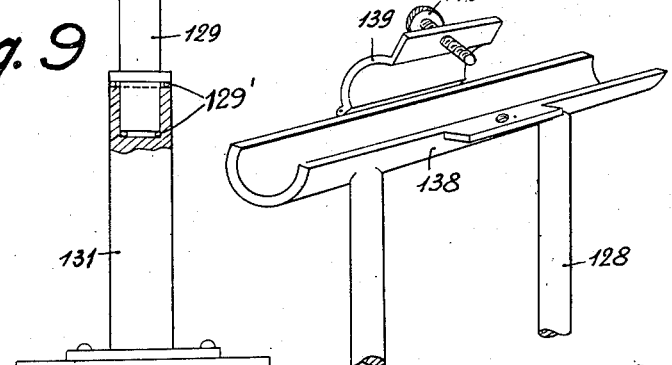
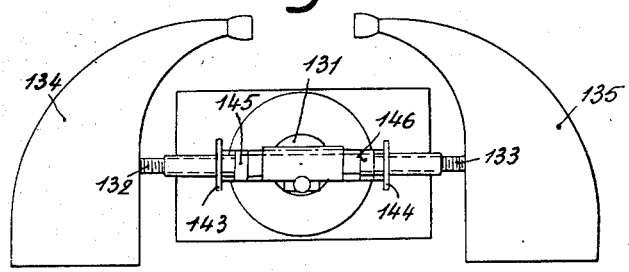
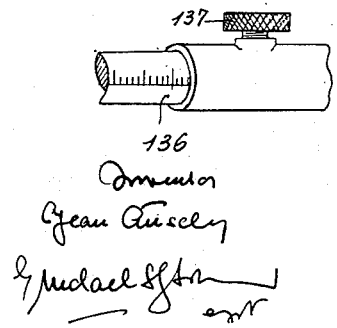

Patented Dec. 19, 1950

2,534,847

UNITED STATES PATENT OFFICE 2,534,847

DIRECTIONAL SOUND DETECTOR

Jean Auscher, Paris, France

Application July 30, 1947, Serial No. 764,681
In France March 13, 1940

16 Claims. (Cl. 181—26)

1

The present invention relates to a sound detector which enables to fix the position of a sound source.

It is the object of the present invention to provide a compact arrangement incorporating the head set and the actual locator.

A sound detector according to the present invention comprises a stationary support, a movable frame rotatably carried thereby, means adapted to register the angular setting of the movable frame with respect to the stationary support, two hollow elongated searching members mounted on the movable frame for rotation therewith and symmetrically located with reference to the axis of rotation of the latter, two earpieces forming a head set and lying in opposed locations on a line parallel to and laterally shifted with reference to the line joining the input ends of the searching members and rigid bent tubes, the diameter of which is equal to at least one half of the diameter of the searching members at the output end thereof, said tubes connecting the searching members through their output end with the ear-pieces.

Fig. 1 is a front view of a first embodiment of the present invention;

Figs. 2 and 3 are respectively side and front views corresponding to Fig. 1;

Figure 4 is a sectional side elevation and a front view of a searching member;

Figure 5 is a side elevation, partly broken away, of a modification of a searching member;

Figs. 6, 7 and 8 are respectively front, side and plan views of a second embodiment of the invention;

Figs. 9 and 10 are respectively front and side views of another embodiment of the invention;

Figs. 11 and 12 are detailed views corresponding to Figs. 9 and 10;

Figure 14:
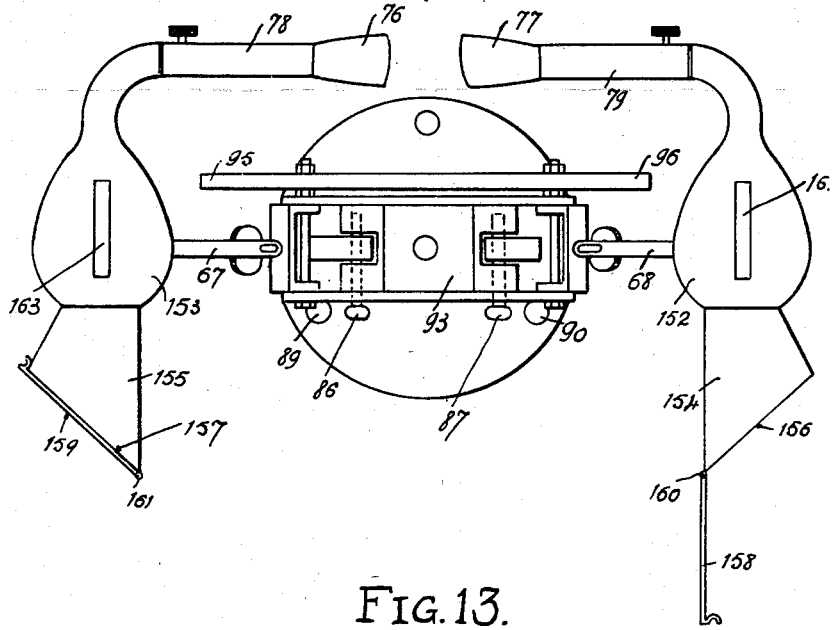
Figs. 13 and 14 are plan views, respectively, of two more embodiments of the present invention.

In the embodiment shown in Figs. 1 to 3, the listening apparatus comprises two searching members 65 and 66 connected, respectively, to rods 72, 73 which may be integral with the searching members 65, 66, respectively. The rods 72, 73 are slidably arranged, respectively, in tubes 67, 68 provided with set screws 74, 75, respectively, for securing the rods 72, 73, in position. The tubes 67, 68 are hinged at their lower ends by pivots 69 and 70, respectively, to the structure of the apparatus.

Each searching member 65, 66 is connected to a corresponding ear piece 76, 77, by tubings 78, 79, the diameter of which is advantageously between half and two-thirds of the outlets of the searching members.

Each tube 67, 68, is fixed in angular position by means of rods 80, 81, hinged on the frame 71, and sliding through apertures in the tubes 67, 68; the outer ends of the rods 80, 81 are threaded and carry adjusting nuts 82, 83; the tubes 67, 68 are pressed against the nuts 82, 83 by means of expansion springs 84, 85.

The angular displacement of each of the tubes 67, 68 with respect to the vertical axis of the apparatus can be registered by means of an index integral with each tube and which moves across a calibrated dial integral with the frame 71.

In an advantageous embodiment, the rods 80, 81 are connected to the frame 71, by means of stop bolts, 86, 87. This disposition enables to free the rods 80, 81 of the frame to turn the search organs down against the supporting base of the apparatus. This supporting base is constituted by a column 88, which can be fixed to the ground, for instance by means of bolts 89, 90, and in which slides a rod 91 integral with the frame 71. The rod 91 can be raised by means of a known device such as a screw jack (not shown) operated by the wheel 92. The frame 71 is mounted so as to rotate in a horizontal plane about the rod 91 as axis. The upper end of the rod 91 is provided with a compass 93 and the rotating displacements of the frame 71 with respect to the magnetic north can be registered by means of an index engraved in the cover 94 integral with the frame 71 and moving over the compass graduations.

The operation of this device is as follows:

When the operator is standing up the variation of angular distance of the sleeves 67 and 68 with respect to the vertical axis A of the whole assembly enables to adjust the ear pieces 76, 77, to the width of the operator's head, while the longitudinal displacements of the rods 72, 73, with respect to the tubes 67, 68 enable to make the vertical adjustments.

The operation of this device is as follows:

The column 88 is secured to the bottom (not shown) by means of the bolts 89, 90. The handles 95, 96 enable to orientate the search organs.

Figure 4 shows a longitudinal cross-section and a front view of another embodiment of a searching member according to the invention which comprises three parts 54, 55, 56, fitting into one another.

The searching member may be ovalized for a reason to be more fully stated hereinafter.

Figure 5 shows another embodiment of a searching member which comprises a funnel 57 combined with a shell-like resonator 58 connected to the tube 78. Deflecting plates 59 and reflecting plates 60 are arranged inside the resonator 58, the position of which can be adjusted by sliding on a supporting rod 61. The function of the resonator 58 is to amplify the sound waves caught by the funnel 57 so that the sensitivity and the range of the devices are increased. Plate 59 has the function to deflect towards the resonator 58 the sound waves which otherwise would reach directly the tube 78 without being amplified and would interfere with the amplified waves. Plate 60 is adapted to reflect towards the tube 78 the sound waves previously reflected by the resonator 58 in such a direction as to escape to the outside to the funnel 57.

The funnel 57 may be ovalized in order to increase the accuracy of the device. In this manner the sound waves are only caught when the device is exactly in the direction of the sound source.

In the embodiment shown in Figures 6 to 8, rods 108, 109 are integral with the searching members 110 and 111, and hinged at 112, 113 to a horizontal rod 116 supported at its center by a graduated circular scale 117. The angular displacements of the rods 108, 109 are registered on dials 114, 115 respectively.

The assembly is mounted so as to revolve on a tripod 118 and the circular displacements of this assembly with respect to the tripod are registered by means of the graduations on the circular mobile scale 117, and of an index 119 integral with the tripod and orientated conveniently. The listening part B can thus be arranged at a level above the head of the operator, the apparatus being particularly advantageous when the operator is protected for instance by the parapet of a trench.

A seat 120 is articulated at 121 to one of the legs of the tripod 118, and fitted with two legs 122, 123 hinged on the seat 120. The operator uses the apparatus by utilizing the rod 116 as the rotation control rod. It should be understood that the searching members 110, 111, can be mounted or fitted in any manner on the ends of the arms 108, 109, and, for instance, be mounted so as to rotate in a fork integral with the corresponding arm. Moreover, the arms 108, 109 can be secured in the angular position desired, with respect to rod 116 by means of nuts 124, 125 (Fig. 8).

In the embodiment shown in Figs. 9 to 12 a bar 126 is supported by a rod 127 and an intermediate fork 128. The fork 128 can be raised or lowered by sliding the rod 127 in a tube 129, the rod 127 being secured in position by a set screw or a locking pin 130, passing through the tube 129 and the rod 127. The rod 129 is mounted so as to revolve in the base 131, for instance by means of ball bearings 129'. The bar 126 is tubular, see Fig. 11, and the rods 132, 133 which carry the search organs 134, 135, can slide in the bar 126, their position being registered by means of a graduation 136 and they can be secured in position, for instance by a set screw 137 (Fig. 11). The bar 126 rests in a trough 138 (Fig. 12) integral with the fork 128. In order to secure the bar 126 in position a cover 139 is hinged to the trough 138 and is secured in operating position by means of a wing nut 140.

To determine the angle of elevation, the fork 128 is rotated on the base 131 by means of handles 141, 142, and the amount of rotation of this fork can be registered as in the embodiments described above, by means of an index moving across a graduation.

The bar 126 comprises set collars 143, 144, together with other set stops 145, 146, integral with the trough 138 for limiting the longitudinal displacements with respect to the fork 128.

The angle of elevation or the angle of site can be determined by giving the apparatus an orientation so that one ear ceases to hear a sound and that the other ear begins to perceive it. It is then necessary to make the directional sensitivity of the searching members greater.

Figure 13:
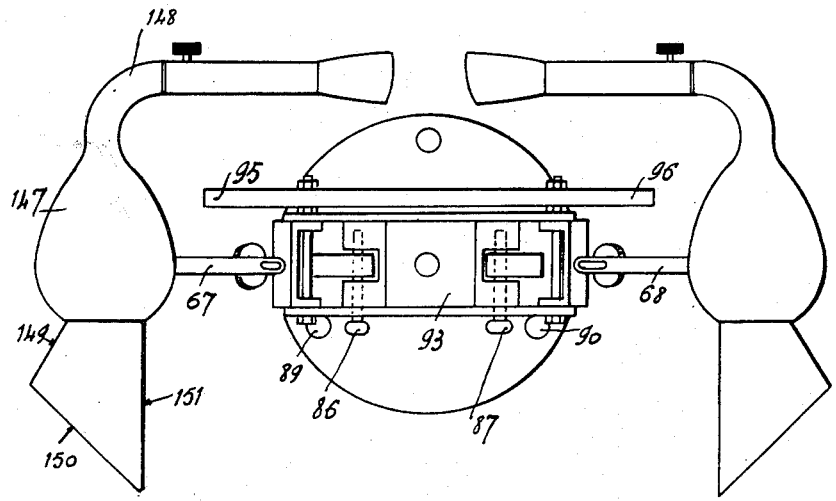

The embodiment shown in Fig. 13 has a searching member constituted by a substantially spherical hollow cavity 147, connected to the ear piece by a tube 148. The sound is caught by an element 149, the opening of which has a diagonal edge arranged at an angle, for instance 45°, with respect to the symmetrical plane of the bar 67, 68.

The directional sensitivity can be made still larger by prolonging according to the embodiment shown in Fig. 14, by a plane plate 158, 159, hinged at 160, 161 at points nearest to the symmetrical plane of the search device bar so as to act as a cover for the opening. This hinged plate 158 or 159 has the advantage of closing the opening of the receiving searching member when it is not in use.

The searching members proper comprise according to the embodiment shown in Fig. 14, two oval shells 152, 153 with hollow searching members 154, 155 to catch the sounds. The planes referring to the openings 156, 157 of the search members make acute angles, for instance 45° with the symmetrical plane of the search device bar. The searching members are closed by covers 158, 159, hinged at 160, 161, which constitute in the open position directional plates. Moreover, a luminous bar 162, 163 is provided respectively, on each of the cavities 152, 153, in their longitudinal axis, the bars indicating to the observers that the apparatus is in operating position and is approximately pointing in the direction of the sound source searched for.

What I claim is:

1. A sound detector comprising in combination a stationary support, a movable frame rotatably carried thereby, means adapted to register the angular setting of said movable frame with respect to the stationary support, two hollow elongated searching members mounted on the movable frame for rotation therewith and symmetrically located with reference to the axis of rotation of the latter, two ear-pieces forming a head set and lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output end with the ear-pieces.

2. A sound detector comprising in combination a stationary support, a movable frame rotatably carried thereby, means adapted to register the angular setting of said movable frame with respect to the stationary support, two hollow elongated searching members including a resonator, a funnel-shaped entrance for said resonator and an outwardly convex sound deflecting member inside said resonator provided with a concave reflecting surface facing the output end of the resonator, said members being mounted on the movable frame for rotation therewith and symmetrically located with reference to the axis of rotation of the latter, two ear-pieces forming a head-set and lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output end with the ear-pieces.

3. A sound detector comprising in combination a stationary support, a nonrotatable spindle vertically slidable in said stationary base, a movable frame rotatably carried thereby, means adapted to register the angular setting of said movable frame with respect to the stationary support, two hollow elongated searching members mounted on the movable frame for rotation therewith and symmetrically located with reference to the axis of rotation of the spindle, two ear-pieces forming a head set and lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output end with the ear-pieces, means for locking the movable frame in any desired angular position.

4. A sound detector comprising in combination a stationary support, a nonrotatable spindle vertically slidable in said stationary base, a movable frame rotatably carried thereby, means adapted to register the angular setting of said movable frame with respect to the stationary support, tubular arms linked with the movable frame at two points thereof symmetrical of one another with reference to the axis of rotation of the frame, two rods sliding in the free end of each tubular arm, two elongated hollow sound searching members rigid with the outer end of each rod, two ear-pieces forming a head set and lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output end with the ear-pieces, means for locking the movable frame in any desired angular position.

5. A sound detector comprising in combination a stationary support, a nonrotatable spindle vertically slidable in said stationary base, means for raising and lowering the sliding spindle to the desired level, a movable frame rotatably carried thereby, means adapted to register the angular setting of said movable frame with respect to the stationary support, tubular arms linked with the movable frame at two points thereof symmetrical of one another with reference to the axis of rotation of the frame, two rods sliding in the free end of each tubular arm, two elongated hollow sound searching members rigid with the outer end of each rod, means for locking the tubular arms in the desired angular position with reference to verticality, two ear-pieces forming a head set and lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output end with the ear-pieces, means for locking the movable frame in any desired angular position.

6. A sound detector comprising in combination a stationary support, a non-rotatable spindle vertically slidable in said stationary support, means for raising and lowering the sliding spindle to the desired level, a movable frame rotatably carried thereby, means adapted to register the angular setting of said movable frame with respect to the stationary support, tubular arms linked with the movable frame at two points thereof symmetrical with one another with reference to the axis of rotation of the frame, two rods sliding in the free end of each tubular arm, two elongated hollow sound searching members rigid with the outer end of each rod, two auxiliary rods arranged radially and symmetrically of the movable frame, pivotally secured thereto at their inner ends and passing through the tubular arms and provided with threaded outer ends, two nuts adjustably screwed over the auxiliary rods for urging the tubular arms into the desired angular position with reference to verticality, two ear-pieces forming a head set and lying in opposed locations on a line parallel to and laterally shifted with reference to the line joining the input ends of the searching members, and rigid bent tubes the diameter of which is equal to at least one-half of the diameter of the searching members at the output end thereof, said tubes connecting the searching members through their output end with the ear-pieces.

7. A sound detector comprising in combination a stationary support, a nonrotatable spindle vertically slidable in said stationary support, means for raising and lowering the sliding spindle to the desired level, a movable frame rotatably carried thereby, means adapted to register the angular setting of said movable frame with respect to the stationary support, tubular arms linked with the movable frame at two points thereof symmetrical with one another with reference to the axis of rotation of the frame, two rods sliding in the free end of each tubular arm, two elongated hollow sound searching members rigid with the outer end of each rod, two auxiliary rods arranged radially and symmetrically of the movable frame pivotally secured thereto at their inner ends and passing through the tubular arms and provided with threaded outer ends, two nuts adjustably screwed over the auxiliary rods for urging the tubular arms into the desired angular position with reference to verticality, springs fitted round each auxiliary rod between the inner end thereof and the surface of each tubular arm facing said end, two ear-pieces forming a head set and lying in opposed locations on a line parallel to and laterally shifted with reference to the line joining the input ends of the searching members, and rigid bent tubes the diameter of which is equal to at least one-half of the diameter of the searching members at the output end thereof, said tubes connecting the searching members through their output end with the ear-pieces.

8. A sound detector comprising in combination a stationary support, a nonrotatable spindle vertically slidable in said stationary base, means for raising and lowering the sliding spindle to the desired level, a movable frame rotatably carried thereby, means adapted to register the angular setting of said movable frame with respect to the stationary support, tubular arms linked with the movable frame at two points thereof symmetrical with one another with reference to the axis of rotation of the frame, two rods sliding in the free end of each tubular arm, two elongated hollow sound searching members rigid with the outer end of each rod, two auxiliary rods arranged radially and symmetrically of the movable frame detachably, adjustably and pivotally secured thereto at their inner ends and passing through the tubular arms and provided with threaded outer ends, two nuts adjustably screwed over the auxiliary rods for urging the tubular arms into the desired angular position with reference to verticality, two ear-pieces forming a head set and lying in opposed locations on a line parallel to and laterally shifted with reference to the line joining the input ends of the searching members, and rigid bent tubes the diameter of which is equal to at least one-half of the diameter of the searching members at the output end thereof, said tubes connecting the searching members through their output end with the ear-pieces.

9. A sound detector comprising in combination a stationary support, a movable frame rotatably carried thereby, means adapted to register the angular setting of said movable frame with respect to the stationary support, two hollow elongated searching members including a resonator and a sound receiving funnel opening into same and the opening of which is defined by an oblique plane, mounted on the movable frame for rotation therewith and symmetrically located with reference to the axis of rotation of the latter, two ear-pieces forming a head set and lying in opposed location on a line parallel to and laterally shifted with reference to the line joining the input ends of the searching members, and rigid bent tubes the diameter of which is equal to at least one-half of the diameter of the searching members at the output end thereof, said tubes connecting the searching members through their output end with the ear-pieces.

10. A sound detector comprising in combination a stationary support, a movable frame rotatably carried thereby, means adapted to register the angular setting of said movable frame with respect to the stationary support, two hollow elongated searching members including a resonator and a sound receiving funnel opening into same and the opening of which is defined by an oblique plane sloping with respect to a plane perpendicular to the axis of rotation of the movable frame with the tip of the opening outline as near as possible to said axis, said searching members being mounted on the movable frame for rotation therewith and symmetrically located with reference to the axis of rotation of the latter, two ear-pieces forming a head-set and lying in opposed locations on a line parallel to and laterally shifted with reference to the line joining the input ends of the searching members at the output end thereof, and rigid tubes connecting the searching members through their output ends with the ear-pieces.

11. A sound detector comprising in combination a stationary support, a movable frame rotatably carried thereby, means adapted to register the angular setting of said movable frame with respect to the stationary support, two hollow elongated searching members including a resonator and a sound receiving funnel opening into same and the opening of which is defined by an oblique plane sloping with respect to a plane perpendicular to the axis of rotation of the movable frame with the tip of the opening outline as near as possible to said axis, a directional plate for said funnel extending normally beyond and in alignment with the side of said funnel nearest the axis of rotation, said searching members being mounted on the movable frame for rotation therewith and symmetrically located with reference to the axis of rotation of the latter, two ear-pieces forming a head-set and lying in opposed locations on a line parallel to and laterally shifted with reference to the line joining the input ends of the searching members, and rigid bent tubes the diameter of which is equal to at least one-half of the diameter of the searching members at the output end thereof, said tubes connecting the searching members through their output end with the ear-pieces.

12. A sound detector comprising in combination a stationary support, a movable frame rotatably carried thereby, means adapted to register the angular setting of said movable frame with respect to the stationary support, two hollow elongated searching members including a resonator and a sound receiving funnel opening into same and the opening of which is defined by an oblique plane sloping with respect to a plane perpendicular to the axis of rotation of the movable frame with the tip of the opening outline as near as possible to said axis, a directional plate for said funnel extending normally beyond and in alignment with the side of said funnel nearest the axis of rotation, said plate being hinged to said funnel and being adapted to rock into covering engagement with the latter, said searching members being mounted on the movable frame for rotation therewith and symmetrically located with reference to the axis of rotation of the latter, two ear-pieces forming a head set and lying in opposed locations on a line parallel to and laterally shifted with reference to the line joining the input ends of the searching members, and rigid bent tubes the diameter of which is equal to at least one-half of the diameter of the searching members at the output end thereof, said tubes connecting the searching members through their output ends with the ear-pieces.

13. A sound detector comprising in combination a stationary support, a horizontal bar pivotally carried by the upper part of the support, a scale and index system registering the angular setting of the arm, radial upwardly directed arms pivotally secured to the outer ends of the horizontal arm, two searching members at the outer ends of the radial arms, ear-pieces substantially at the level of the horizontal arm lying in opposed locations on a line parallel to and laterally shifted with reference to the line joining the input ends of the searching members and rigid bent tubes the diameter of which is equal to at least one-half of the diameter of the searching members at the output end thereof, said tubes connecting the searching members through their output ends with the ear-pieces.

14. A sound detector comprising in combination a stationary tripod, a seat pivotally secured to one branch of said tripod, a horizontal bar pivotally carried by the upper part of the tripod, a scale and index system registering the angular setting of the arm, radial arms pivotally secured to the outer ends of the horizontal arm for movement in a vertical plane, two searching members at the outer ends of the radial arms, ear-pieces substantially at the level of the horizontal arm lying in opposed locations on a line parallel to and laterally shifted with reference to the line joining the input ends of the searching members and rigid bent tubes, the diameter of which is equal to at least one-half of the diameter of the searching members at the output end thereof, said tubes connecting the searching members through their output ends with the ear-pieces.

15. A sound detector comprising a stationary base, a vertical rod revolubly carried thereby, a support carried by said rod at an adjustable height, a horizontal bar removably secured to the upper end of said support and passing through the axis of rotation of the vertical rod, elongated sound searching members carried at either end of said bar, means registering the angular setting of the support and bar, two ear-pieces lying in opposed locations on a line parallel to and laterally shifted with reference to the line joining the input ends of the searching members and rigid bent tubes the diameter of which is equal to at least one-half of the diameter of the searching members at the output end thereof, said tubes connecting the searching members through their output ends with the ear-pieces.

16. A sound detector comprising a stationary base, a vertical rod revolubly carried thereby, a support carried by said rod at an adjustable height, a horizontal bar removably secured to the upper end of said support and passing through the axis of rotation of the vertical rod, elongated sound searching members, means for adjustably securing the searching members to the bar at selected points thereof symmetrically of the axis of the vertical rod, means registering the angular setting of the support and bar, ear-pieces lying in opposed locations on a line parallel to and laterally shifted with reference to the line joining the input ends of the searching members and rigid bent tubes the diameter of which is equal to at least one-half of the diameter of the searching members at the output end thereof, said tubes connecting the searching members through their output ends with the ear-pieces.

JEAN AUSCHER.

REFERENCES CITED

The following references are of record in the file of this patent:

UNITED STATES PATENTS

| Number | Name | Date |
| --- | --- | --- |
| 1,328,059 | Schreiner | Jan. 13, 1920 |
| 1,467,545 | Hornbostel | Sept. 11, 1923 |
| 1,757,874 | Petschenig | May 6, 1930 |
| 1,758,393 | Ely | May 13, 1930 |
| 2,199,404 | House | May 7, 1940 |
| 2,228,024 | Abrahams | Jan. 7, 1941 |

FOREIGN PATENTS

| Number | Country | Date |
| --- | --- | --- |
| 24,888 | Great Britain | Dec. 6, 1901 |
| 305,168 | Germany | Oct. 9, 1919 |